United States Patent [19]

Lyons

[11] Patent Number: 4,477,947
[45] Date of Patent: Oct. 23, 1984

[54] DRAWSTRING FASTENER

[76] Inventor: William J. Lyons, 9650 Mark Rd., Erie, Pa. 16509

[21] Appl. No.: 437,283

[22] Filed: Jan. 13, 1983

[51] Int. Cl.³ .............................................. F16G 11/14
[52] U.S. Cl. .................................. 24/115 F; 24/49 R; 24/115 G; 24/133; 24/134 L
[58] Field of Search ................. 24/115 F, 115 G, 133, 24/134 L, 266, 49 R, 49 KC, 615, 116 R

[56] References Cited

U.S. PATENT DOCUMENTS

| | | | |
|---|---|---|---|
| 572,390 | 12/1896 | Weir | 24/115 G |
| 968,638 | 8/1910 | Belling | 24/133 |
| 1,063,354 | 6/1913 | Kimlin | 24/134 L |
| 1,533,504 | 4/1925 | Kunz | 24/133 |
| 2,193,383 | 3/1940 | Salzer | 24/134 KA |
| 3,812,811 | 5/1974 | Rodriguez | 24/115 F |
| 3,955,715 | 5/1976 | Topor | 312/111 |
| 4,112,551 | 9/1978 | Sales | 24/266 |
| 4,270,491 | 6/1981 | Cox | 24/115 G |

Primary Examiner—Victor N. Sakran
Attorney, Agent, or Firm—Ralph Hammar

[57] ABSTRACT

A fastener for releasably securing the ends of a drawstring. The fastener has two parts, one for each end of the drawstring. The parts are held together by a dovetail connection which is separated by excessive tension in the drawstring. At least one of the parts is connected to the associated end of the drawstring by a connection which resists movements of the drawstring in the direction to enlarge or loosen the string, but is easily released to permit intentional loosening of the string.

4 Claims, 5 Drawing Figures

U.S. Patent    Oct. 23, 1984    4,477,947
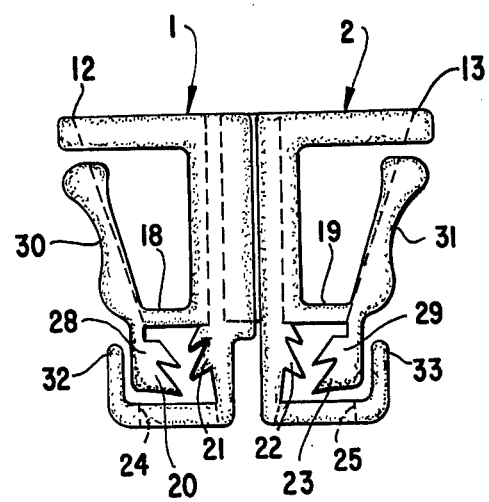
FIG. 1
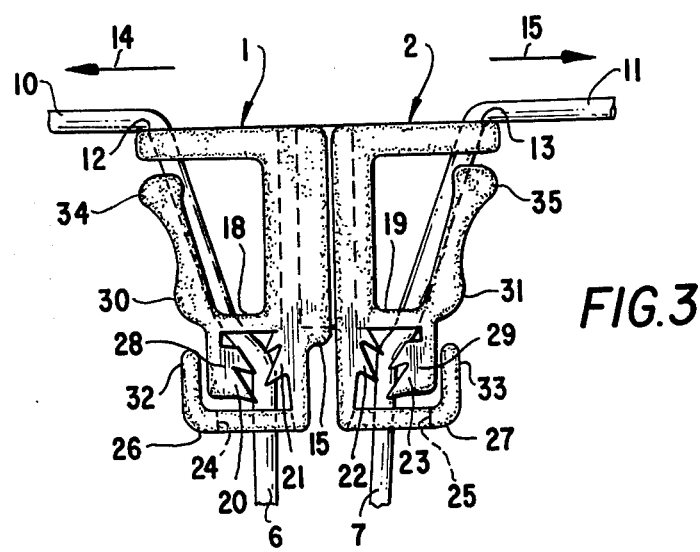
FIG. 3
FIG. 4    FIG. 5
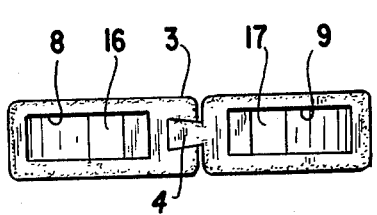
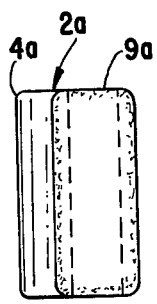
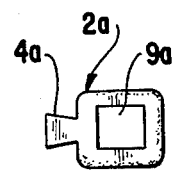
FIG. 2

DRAWSTRING FASTENER

This invention is a drawstring fastener combination in which the grip of the fastener on the drawstring is automatically released when the tension exceeds a predetermined value, but so long as the tension is below that value, the ends of the drawstring are securely held together unless the grip on the drawstring is intentionally released to permit changing of the position or tightening or loosening of the drawstring.

In the drawing,

FIG. 1 is a front elevation of a drawstring fastener,

FIG. 2 is a top view of FIG. 1,

FIG. 3 is a diagrammatic view showing the FIG. 1 fastener fitted with a drawstring, FIG. 4 is a front elevation of a part which may be substituted for one of the parts in FIG. 1, and FIG. 5 is a top view of FIG. 4.

The fastener shown in FIGS. 1-3 is conveniently injection molded from one of the impact resistant plastics, such as polypropylene. The plastics are available in a variety of colors which can be chosen to match or harmonize with clothing with which the drawstring is to be used. The fastener comprises two molded parts 1 and 2 which are connected together by a dovetail connection 3, 4. At the bottom of the connection 3 is a stop 5 which positions the parts in the assembled relation shown in FIG. 1.

In use, one part of the fastener is associated with each end of the drawstring. End 6 of the drawstring is associated with fastener part 1, and end 7 of the drawstring is associated with fastener part 2. The fastener parts 1 and 2 are shown as symmetrical to provide maximum convenience, but in practice, one end of the drawstring could be permanently fixed to its associated fastener part. That would require twice the movement of the other end of the drawstring for the same tightening or loosening effect, which might not be objectionable in some circumstances.

At the top of the fastener parts 1 and 2 are rectangular openings 8 and 9 through which the portions 10, 11 of the drawstring forming part of the loop to be tightened or loosened extend. When the drawstring is tightened, the portions 10, 11 of the drawstring are under tension and extend over edges 12, 13 of the fastener parts, applying tension in the direction of arrows 14, 15, tending to pull the fastener parts apart. The dovetail connections 3, 4 are designed so that the maximum tension which can be developed in the drawstring is limited to a safe value. This is a desirable feature when the drawstring is used for hoods or caps of children's clothing where excessive tension might cause choking. The ends 6 and 7 of the drawstring extend through openings 16 and 17 in center flanges 18 and 19 and down between teeth 20, 21 and 22, 23 and out through openings 24, 25 in bottom flanges 26, 27. The teeth 20 and 23 are respectively on the lower ends 28, 29 of levers 30, 31 integrally hinged on the outer edges of the center flanges 18, 19.

The lower ends 28, 29 of the levers 30, 31 are protected by upwardly extending sections 32, 33 of the bottom flanges 26, 27. The upper ends 34, 35 of the levers 30, 31 are protected by the overhang of the tops of the fastener parts.

The drawstring is tightened by squeezing together the upper ends of the levers 30 and 31, and by grasping the lower ends 6, 7 of the drawstring and sliding the fastener parts 1, 2 as a unit up along the string. Upon release of the squeezing, the levers 30, 31 spring back to the position illustrated where the teeth 20, 23 are oriented to grip or dig into the drawstring and to pivot the levers 30, 31 toward the teeth 21, 22 and securely grip and hold the drawstring against any movement resulting from forces on the string in the direction of arrows 14, 15. The grip of the teeth 20, 23 is overcome by squeezing the upper ends of the levers 30, 31 which permits free movement of the drawstring relative to the teeth in all directions.

FIGS. 4 and 5 show a part 2a which may be substituted for the part 2 in FIG. 1. The part 2a has a dovetail 4a which fits the dovetail groove 3 of part 1. The dovetail assembly 3, 4a has the same properties as the dovetail assembly 3, 4.

In use of the assembly of parts 1 and 2a, the end 6 of the drawstring is slidably received in part 1 and the end 7 of the drawstring is suitably fixed in opening 9a in part 2a. Since only one end 6 of the drawstring slides, it must slide further than when both ends slide for the same tightening or loosening effect. The mode of operation is otherwise the same as FIGS. 1-3.

I claim:

1. A fastener for releasably securing first and second ends of a drawstring for hoods or caps of children's clothing or the like comprising first and second parts, a detachable tension resisting connection between said parts, said first part being fixed to said first end, said second part having a molded plastic body with integral upper, lower and intermediate flanges with aligned openings in the flanges providing a way for receiving said second end of the drawstring, a lever having its upper and lower ends adjacent said upper and lower flanges and having its intermediate portion with an integral connection to said intermediate flange, said intermediate flange and integral connection providing a resilient hinge of said lever to said body, a gripping surface on said body opposite the lower end of said lever for engaging one side of said second end of said string, said lever having its lower end opposite said gripping surface and normally positioned to engage the side of said second end of the string opposite said one side and to be pivoted by said second end of the string against said gripping surface to grip said string by force exerted by said string in one direction on said one end of said lever to thereby prevent movement of said string relative to said body in said one direction, and means for pivoting said lever away from said gripping surface to permit intentional movement of said string relative to said body in said one direction.

2. The structure of claim 1 in which the end of the lever opposite said gripping surface is on one side of the hinge connection and the other end of the lever is on the opposite side of the hinge connection so pivoting of the other end of the lever toward the body causes said one end of the lever to pivot away from said gripping surface.

3. The structure of claim 1 in which said lower end of the lever has teeth cooperating with said gripping surface to grip the string.

4. The structure of claim 3 in which the teeth are angled to dig into the string in response to force exerted in said one direction.

* * * * *